(12) United States Patent
Addis

(10) Patent No.: US 7,334,311 B2
(45) Date of Patent: Feb. 26, 2008

(54) METHOD OF FORMING A NESTED CAN BRUSH SEAL

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 37 days.

(21) Appl. No.: 10/980,696

(22) Filed: Nov. 3, 2004

(65) Prior Publication Data

US 2006/0091611 A1    May 4, 2006

(51) Int. Cl.
*B21D 39/00* (2006.01)
*F01D 11/02* (2006.01)

(52) U.S. Cl. .......................... 29/520; 29/505; 277/355; 277/307

(58) Field of Classification Search .................. 29/505, 29/520; 277/307, 355
See application file for complete search history.

(56) References Cited

U.S. PATENT DOCUMENTS

| | | | |
|---|---|---|---|
| 885,032 A | | 4/1908 | De Ferranti |
| 3,549,445 A | * | 12/1970 | McMahon .................. 156/222 |
| 3,917,150 A | * | 11/1975 | Ferguson et al. ........... 228/159 |
| 4,645,362 A | * | 2/1987 | Orte ............................ 384/485 |
| 4,678,113 A | * | 7/1987 | Bridges et al. .............. 228/160 |
| 4,781,388 A | | 11/1988 | Wohrl et al. |
| 4,957,301 A | | 9/1990 | Clay et al. |
| 5,066,024 A | * | 11/1991 | Reisinger et al. ........... 277/355 |
| 5,066,025 A | | 11/1991 | Hanrahan |
| 5,090,710 A | | 2/1992 | Flower |
| 5,106,104 A | | 4/1992 | Atkinson et al. |
| 5,114,159 A | | 5/1992 | Baird et al. |
| 5,135,237 A | | 8/1992 | Flower |
| 5,183,197 A | * | 2/1993 | Howe ......................... 228/160 |
| 5,316,318 A | | 5/1994 | Beau |
| 5,425,543 A | | 6/1995 | Buckshaw et al. |
| 5,678,898 A | | 10/1997 | Bagepalli et al. |
| 5,704,760 A | | 1/1998 | Bouchard et al. |
| 5,975,535 A | | 11/1999 | Gail et al. |
| 6,196,550 B1 | | 3/2001 | Arora et al. |
| 6,257,588 B1 | | 7/2001 | Bagepalli et al. |
| 6,293,553 B1 | | 9/2001 | Werner et al. |
| 6,302,400 B1 | * | 10/2001 | Werner et al. .............. 277/355 |
| 6,328,311 B1 | | 12/2001 | Plona et al. |
| 6,331,006 B1 | | 12/2001 | Baily et al. |
| 6,378,873 B1 | | 4/2002 | Mayer et al. |
| 6,536,773 B2 | | 3/2003 | Datta |
| 6,684,479 B2 | * | 2/2004 | Wang et al. ................... 29/521 |
| 2003/0160392 A1 | | 8/2003 | Szymbot et al. |
| 2003/0178778 A1 | * | 9/2003 | Szymbor et al. ............ 277/355 |
| 2003/0201608 A1 | | 10/2003 | Addis |
| 2005/0040602 A1 | | 2/2005 | Beichl et al. |

FOREIGN PATENT DOCUMENTS

DE    34 31 990    3/1986

(Continued)

*Primary Examiner*—David P. Bryant
*Assistant Examiner*—Sarang Afzali
(74) *Attorney, Agent, or Firm*—Marjama Muldoon Blasiak & Sullivan LLP

(57) ABSTRACT

A method of forming a brush seal which includes placing a bristle hoop sandwiched by a sideplate and a backplate in the cavity of a forming die. The components are then die formed together into a unitized brush seal.

8 Claims, 5 Drawing Sheets

FOREIGN PATENT DOCUMENTS

| | | |
|---|---|---|
| DE | 3907614 A1 * | 9/1990 |
| DE | 19528 508 | 2/1997 |
| EP | 0 357 536 | 7/1990 |
| EP | 0 992 721 | 12/2000 |
| EP | 1347218 | 9/2003 |
| EP | 1353097 | 10/2003 |
| GB | 2 191 825 | 12/1987 |
| WO | 9906673 | 11/1999 |
| WO | WO 01/13013 | 2/2001 |

* cited by examiner

METHOD OF FORMING A NESTED CAN BRUSH SEAL

FIELD OF THE INVENTION

This invention relates generally to a brush seal and more specifically to a method of making a lower cost and/or lighter weight brush seal.

BACKGROUND OF THE INVENTION

Brush seals are commonly used on gas turbine engines. The brush seal is typically used to prevent secondary flow in the engine from escaping through a gap between a stationary part such as a diffuser case and a rotating part (e.g. a turbine shaft). Brush seals may also have other uses, such as sealing a gap between stationary parts of the engine.

A brush seal typically includes packs of wire bristles sandwiched between plates. The bristle packs and plates are typically welded together to form the brush seal. The brush seal must undergo heat treatment after the welding step to relieve any residual stresses. Heat treatment typically involves securing the brush seal within a fixture, then placing the fixture in an oven. The heat treatment process is time consuming and can be expensive.

The welding step transforms the discrete sub-assemblies of the brush seal into one piece. The one-piece arrangement prevents the removal of a sub-assembly without affecting or damaging the remainder of the brush seal. This means a mechanic must replace the entire brush seal during maintenance. Replacement of the entire brush seal must occur despite the fact that only one of the sub-assemblies (typically the bristle packs) needs replacement.

The bristle packs of the brush seal are expensive. The main factor influencing cost is the amount of raw material used. Each individual bristle in the bristle pack is taken from a length of wire. A commonly used wire is a 0.0028", 0.004" or 0.006" diameter cobalt alloy wire. One type of bristle pack can have approximately 5000 bristles per linear inch. This type of bristle pack clearly contains a large amount of wire. When used in a 12" outer diameter single stage brush seal, this type of bristle pack can contain approximately 2.6 miles of wire.

It is therefore an object of the present invention to provide a new and improved brush seal.

It is a further object of the present invention to provide a method of producing a lower cost and/or lighter weight brush seal.

It is a further object of the present invention to produce a brush seal that requires less machining and/or welding.

It is a further object of the present invention to produce a brush seal at a reduced cost.

It is a further object of the present invention to produce a brush seal that uses less raw material.

It is a further object of the present invention to provide a brush seal that may not require heat treatment.

SUMMARY OF THE INVENTION

The invention relates to a method for producing a low cost, lightweight brush seal by mechanically forming and joining the components together in a die.

The brush seal of the present invention utilizes formed sheet metal side and backplates. The cross sectional shape of the plates approximates an "L". One plate is placed in a die and a bristle hoop then placed inside the first formed sheet metal. A plunger is then employed to force a second formed sheet metal plate inside the first sheet metal component, capturing the bristle hoop between the two. The plunger sizes both sheet metal elements during the process. Optionally, spot welding after forming can be used to ensure that the components remain securely attached.

The resulting formed sheet metal configuration would allow plate thickness to be reduced and still maintain similar structural integrity to machined plates. With only spot welding optionally used to secure the two sheets, a final seal stress relieve step may not be needed. This method allows for all features and details to be formed and die cut into the two "plates" to eliminate the need to machine the details.

BRIEF DESCRIPTION OF THE DRAWINGS

For a further understanding of these and objects of the invention, reference will be made to the following detailed description of the invention which is to be read in connection with the accompanying drawings, where.

DETAILED DESCRIPTION OF THE INVENTION

Figure 1:
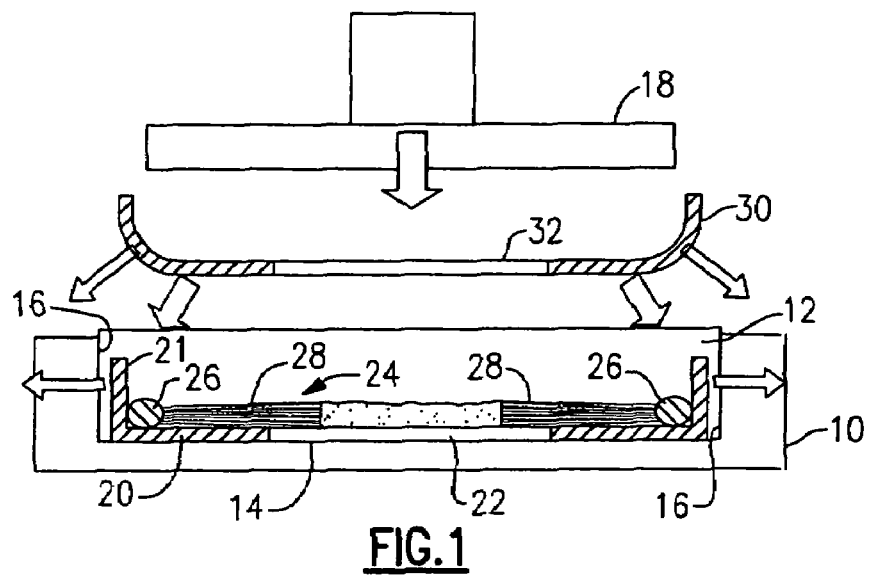
FIG. 1 is a side sectional view of one embodiment of the sizing die and seal components in place prior to a die forming step.

FIG. 1 is a schematic illustration of one embodiment of a forming station for a brush seal which consists of a sizing die 10 which defines a die cavity 12 having a substantially flat bottom 14 and side walls 16. A forming plunger 18 is positioned above the die cavity and is adapted for vertical downward and upward movement as indicated by the vertical arrows in the drawings.

Figure 2:
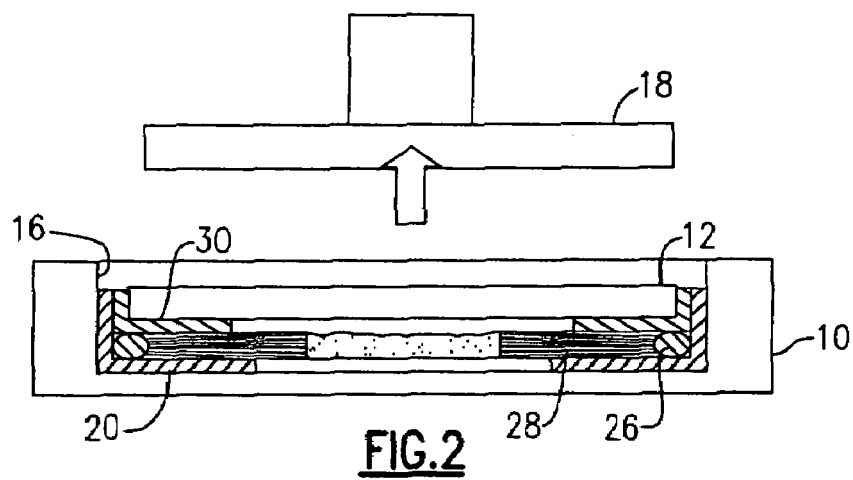
FIG. 2 is a view of FIG. 1 following action by a forming plunger.

In operation, a backplate ring 20 is placed in the bottom of die cavity 12. The backplate ring can have a cross-sectional shape in the form of an "L". Ring 20 can be circular in geometry and can have a central opening 22. In addition to an annular ring, segments of an annular ring or a linear bristle arrangement can also be used. In one embodiment, a bristle hoop 24 is then placed inside (in a radial sense) the backplate ring 20 as shown in FIG. 1. The bristle hoop 24 consists of a weld joint 26 which holds a plurality of bristles in place in the form of a bristle pack 28 such as that described in U.S. Patent Application Publication No. 2003/0178778A1, herein incorporated by reference. A sideplate ring 30 can have a complementary "L" shape configuration and central opening 32. It should be understood that other configurations other than an "L" cross-section can be used. For example a cross-section approximating a "C" or a crescent may also be used. As seen in FIG. 1, the side plate 30 has an outer diameter larger than the inner diameter of the flange 21 of the back plate 20. After placing the side plate 30 against the bristle hoop 24, the plunger 18 is then activated, forcing sideplate ring 30 inside backplate ring 20, and capturing bristle hoop 24 between the two rings. The angled arrows in FIG. 1 illustrate the thrust of the forming forces which force sideplate ring 30 inside backplate ring 20. The plunger 18 sizes both rings during the forming process as shown in FIG. 2 with the forming resulting in a brush seal having the rings and bristle hoop being held together mechanically in fixed engagement. Typically plates 20 and 30 are made of a corrosion resistant alloy such as stainless steel or Inconel.

In an alternative embodiment, the orientation of the leg of the "L" shaped cross section may be reversed relative to the position of the sideplate and backplate. This alternative embodiment allows for suitable mounting of the seal into supporting housings (not shown) and to accommodate for variation in the direction of fluid flow across the seal.

In another embodiment, the rings and bristle arrangement may be joined together by a thermal press fit. In this embodiment the inner plate would be chilled to a temperature below room temperature, and the outer plate (with bristle hoop) would be heated to a temperature above room temperature. Once the components are stabilized at these temperatures, the plates, with the hoop captured inside, can be assembled. The plate interface (ID Of inner plate, OD of outer plate) would be sized for an interference fit when the temperature of the joined assembly components is equalized (i.e. brought back to room temperature). The chilling and heating temperatures chosen would be dependent on the relative size of the seal, and the thermal coefficient of expansion of the metal(s) chosen for the plates. A jig or fixture may be used to align the two plates for proper assembly.

Figure 3:
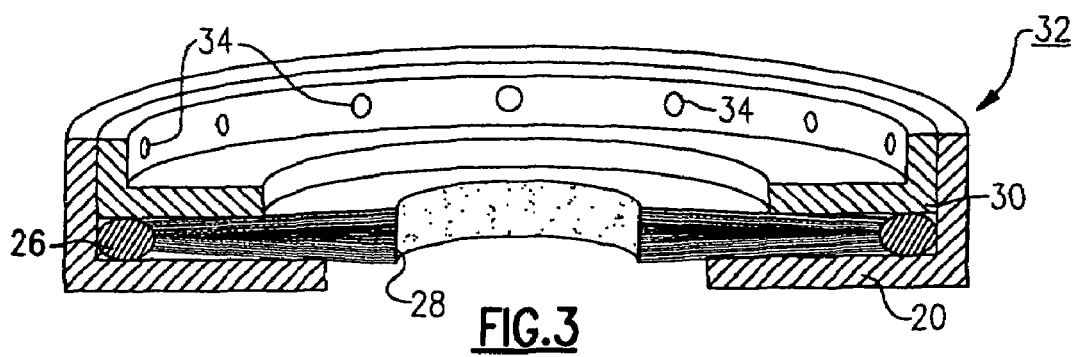
FIG. 3 is a sectional view through one embodiment of a finished brush seal of the invention.

FIG. 3 illustrates a cross sectional view through one embodiment of a finished seal 32. The formed brush seal may be spot welded at 34 to ensure that the components remain permanently attached. Other methods of attachment include crimping the "L" section of plates, brazing, drilling and subsequently bolting or riveting the plates together.

Figure 4:
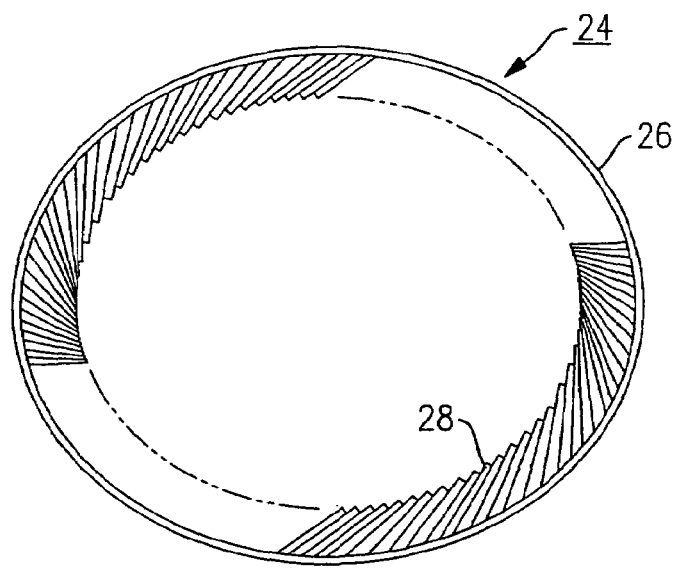
FIG. 4 is a perspective view of a bristle hoop.
Figure 5:
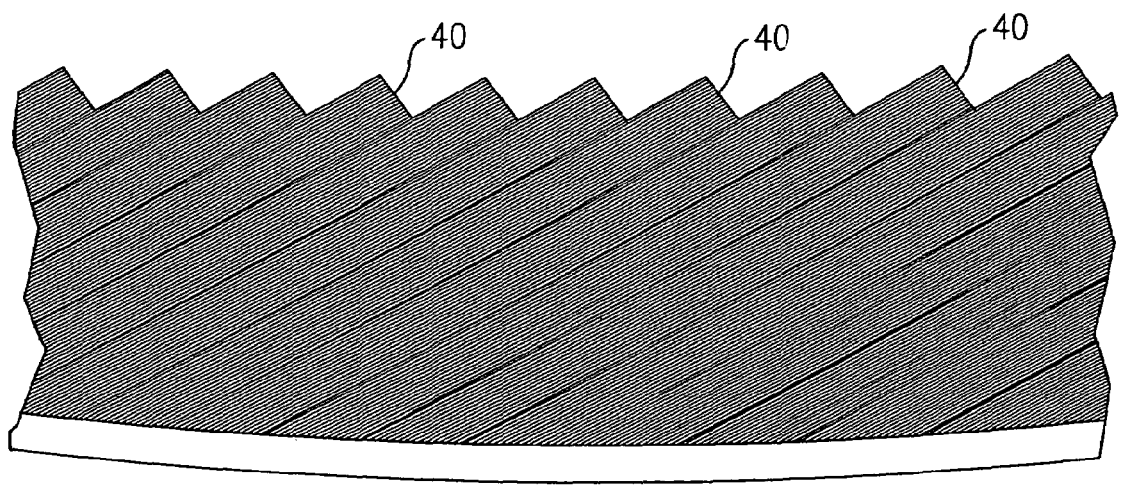
FIG. 5 is a side view of bristle tufts illustrating typical bristle orientation.

FIG. 4 is a view of a typical bristle hoop 24 having bristle packs 28 held in place by a weld joint 26. FIG. 5 is a side view of bristle tufts 40 illustrating typical bristle orientation.

In FIG. 5 the jagged bristle ends represent an unfinished bristle end surface which is finished before use to form a final smooth contact surface using conventional techniques.

Figure 6:
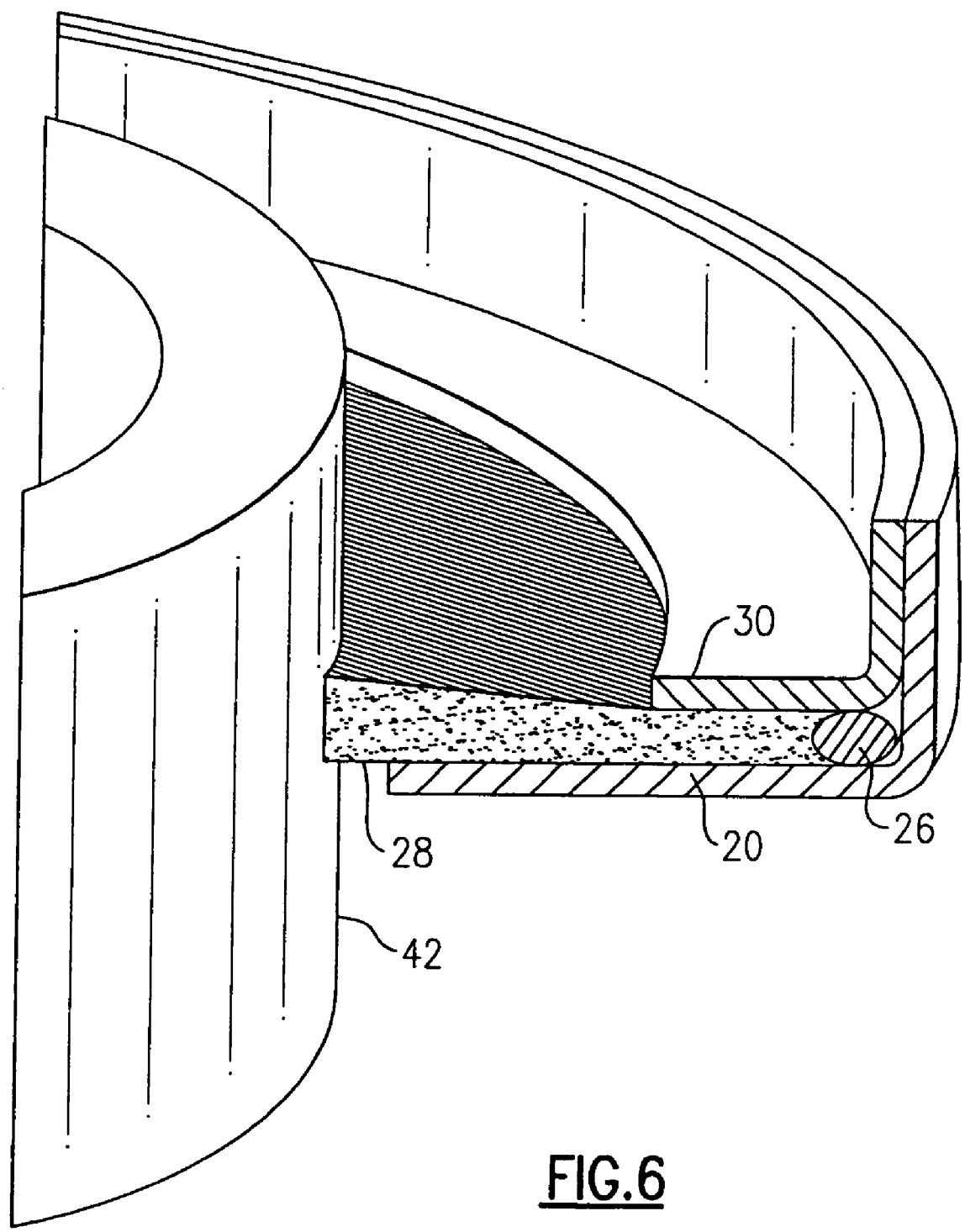
FIG. 6 is a perspective sectional view of one embodiment of a brush seal of the invention in use.

In FIG. 6 illustrates the finished brush seal of FIG. 3 in place against a rotatable shaft 42.

Figure 7:
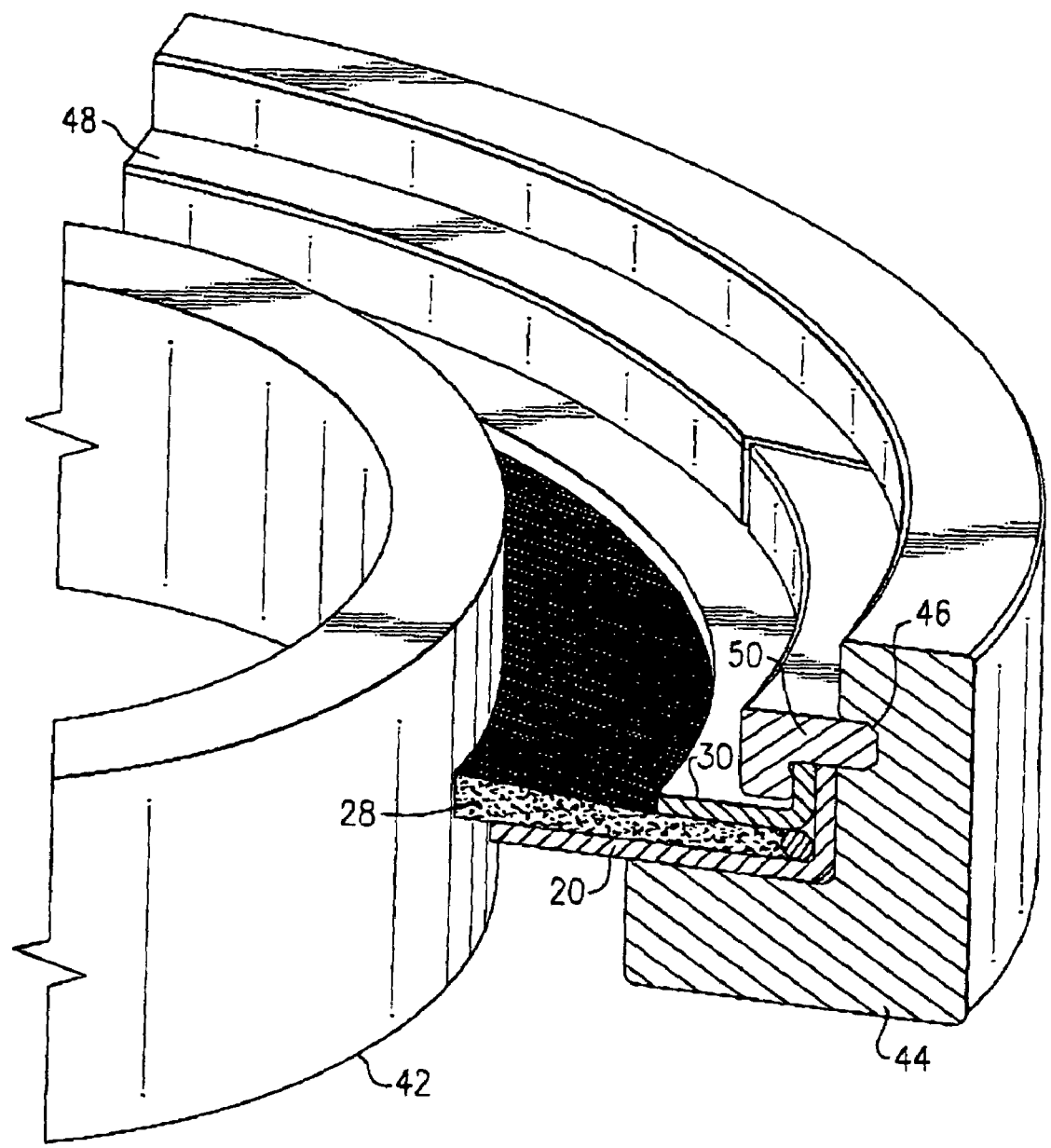
FIG. 7 is a perspective sectional view of the brush seal of the invention mounted in a support housing using a retaining ring.

FIG. 7 illustrates the brush seal of the invention mounted in a support housing 44. The brush seal is maintained in place by a split retaining ring 48 which is held in place through locking flange 50 contained in slot 46 of the housing.

Figure 8:
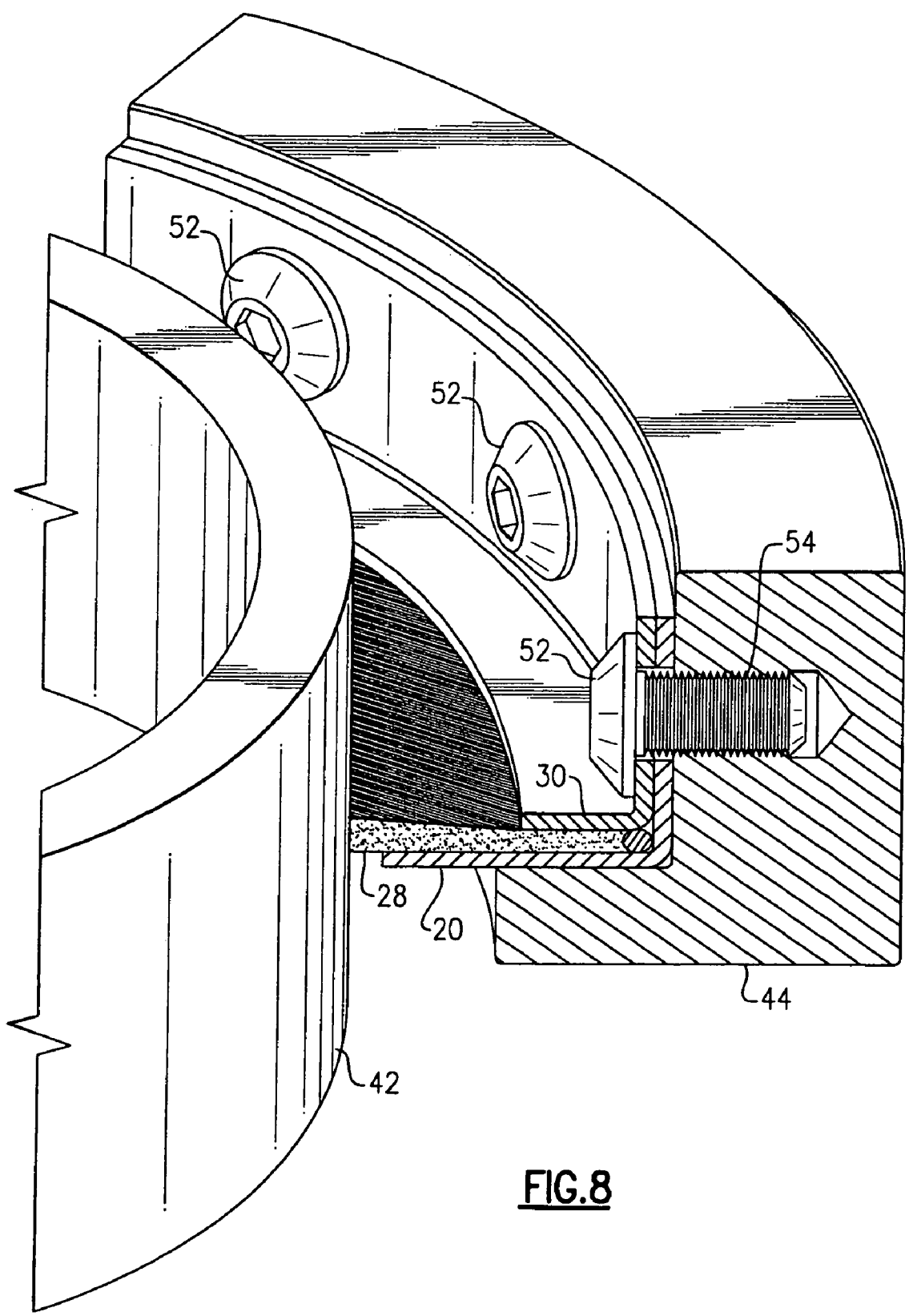
FIG. 8 is a perspective sectional view of the brush seal of the invention mounted in a support housing using screw means.

FIG. 8 illustrates an alternative embodiment for mounting the brush seal in which a plurality of cap screws 52 are used to attach the brush seal to support housing 44 through a hole(s) 54 through the leg of the brush seal.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A method of forming a metal brush seal which comprises;
    (a) providing a first plate member within a molding cavity;
    (b) placing a metal bristle arrangement, which includes a welded joint in engagement with said first plate member;
    (c) placing a second plate member in engagement with said bristle arrangement and inside of the circumference of said first plate member, and
    (d) forcing said components together simultaneously and in fixed engagement with a plunger forced into the cavity to form a unitized metal brush seal.

2. The method of claim 1 in which both plate components have a cross sectional shape which approximates an "L".

3. The method of claim 1 in which said plate members of the finished brush seal are spot welded together at selected locations.

4. The method of claim 1 in which said plate members are made of an alloy selected from the group consisting of stainless steel and Inconel.

5. The method of claim 1, wherein said molding cavity includes a flat bottom section.

6. A method of forming a brush seal which comprises;
    (a) providing a sizing die which includes a molding cavity having a substantially flat bottom section, and an associated forming plunger sized to fit within the cavity,
    (b) positioning a backplate ring component in the bottom section of said molding cavity;
    (c) placing a metal bristle hoop which includes a welded joint in engagement with and inside of said backplate ring component;
    (d) placing a sideplate ring component over said bristle hoop and inside of said backplate ring component thereby capturing said bristle hoop component between said two ring components, and
    (e) activating said plunger to simultaneously force and join said components together in fixed engagement to form a unitized brush seal.

7. The seal of claim 6 in which both ring components have a cross sectional shape which approximates an "L" and define a bottom and side wall, respectively.

8. The method of claim 6 in which the side walls of the finished brush seal are spot welded at selected locations.

* * * * *